United States Patent [19]

Trüschler

[11] Patent Number: 5,649,613
[45] Date of Patent: Jul. 22, 1997

[54] ROTATION CLUTCH FOR THE DRIVE OF CLEANING SPIRALS

[75] Inventor: Jürgen Trüschler, Grossalmerode, Germany

[73] Assignee: Rothenberger Werkzeuge-Maschinen GmbH, Kelkheim/TS., Germany

[21] Appl. No.: 373,172

[22] Filed: Jan. 17, 1995

[30] Foreign Application Priority Data

Jan. 14, 1994 [DE] Germany .......................... 94 00 556.7

[51] Int. Cl.$^6$ .................. F16D 11/04; B08B 9/02
[52] U.S. Cl. .............................. 192/79; 192/93 C
[58] Field of Search .................. 192/93 C, 79; 279/74

[56] References Cited

U.S. PATENT DOCUMENTS

| 1,717,730 | 1/1929 | Mussa . | |
|---|---|---|---|
| 2,278,556 | 4/1942 | Osterholm | 192/93 C X |
| 2,757,523 | 8/1956 | Schmid | 192/79 X |
| 2,940,099 | 6/1960 | Kollman | 15/104 |
| 3,217,519 | 11/1965 | Demler | 279/74 X |
| 3,735,935 | 5/1973 | Nordmeyer | 242/68.3 |
| 4,447,926 | 5/1984 | Rothenberger | 15/104.3 |
| 5,029,356 | 7/1991 | Silverman et al. | 15/104.33 |
| 5,375,489 | 12/1994 | McClure | 279/74 X |

FOREIGN PATENT DOCUMENTS

| 4110832 | 8/1992 | Germany . |
| 8500014 | 8/1986 | Netherlands . |

OTHER PUBLICATIONS

Websters Third New International Dictionary, p. 431.

*Primary Examiner*—Rodney H. Bonck
*Assistant Examiner*—Saul Rodriguez
*Attorney, Agent, or Firm*—Felfe & Lynch

[57] ABSTRACT

A rotary clutch (1) for the drive of cleaning spirals (6) for the cleaning of pipelines has a set of clutch jaws (2), which can move radially with respect to the axis (A—A) of the clutch, each of these jaws having an inner friction surface for carrying along the cleaning spiral (6) and at least one first outer control surface (8), extending at an angle to the clutch axis (A—A). A drivable control sleeve (4 or 5) with at least one second inner control surface (9) can execute relative motion toward this control surface (8), the inner control surface having an inclination comparable to that of the outer control surfaces (8) of the clutch jaw (2). To reduce the actuating forces and to increase the drive torque, the clutch jaws (2) and the control sleeve (4 or 5), at least one of which is provided, are provided with positively engaging carrier elements (10, 11).

5 Claims, 3 Drawing Sheets

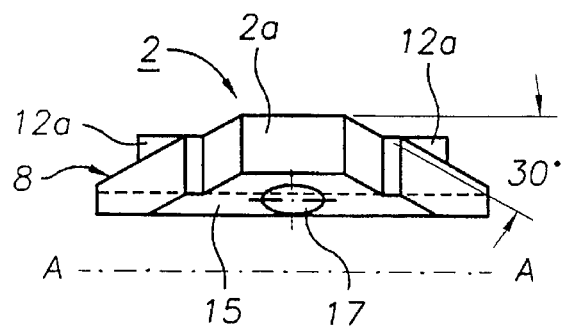
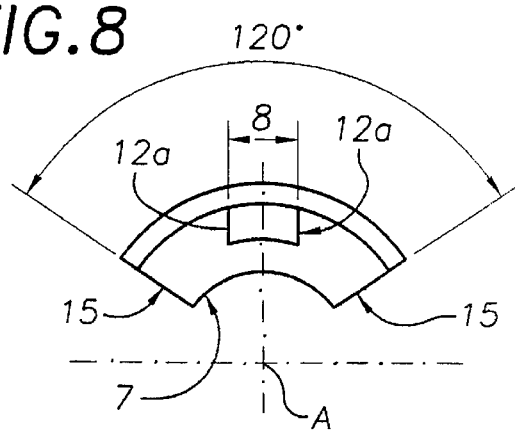
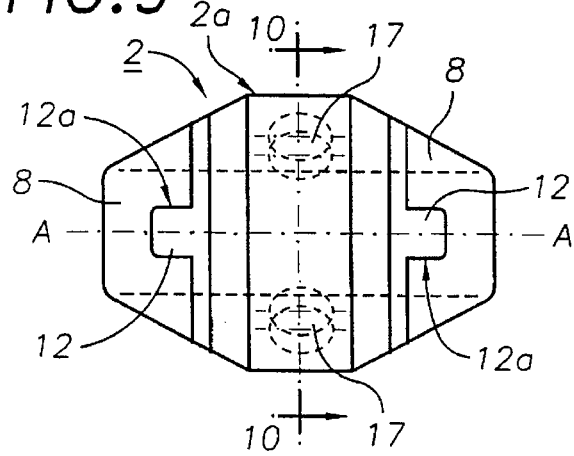
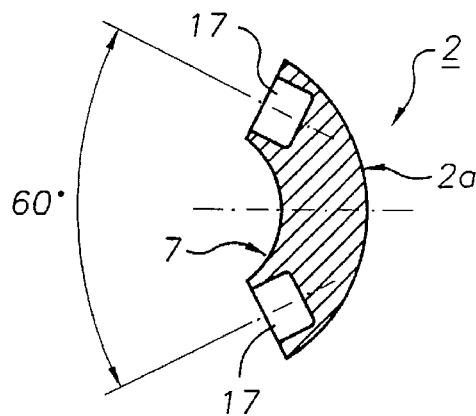
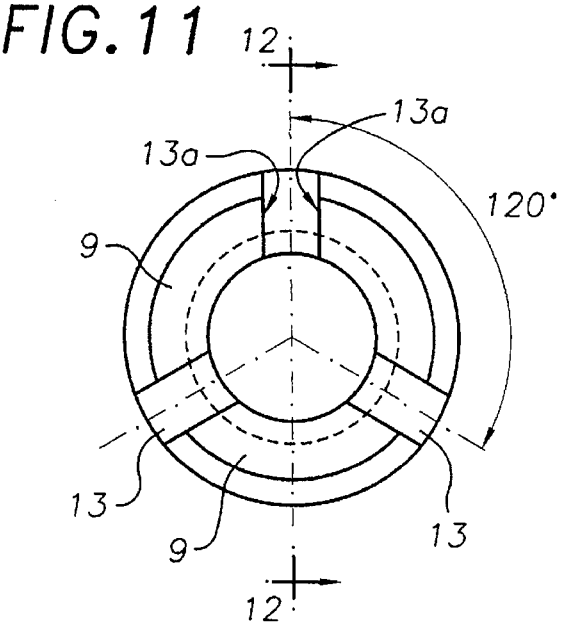
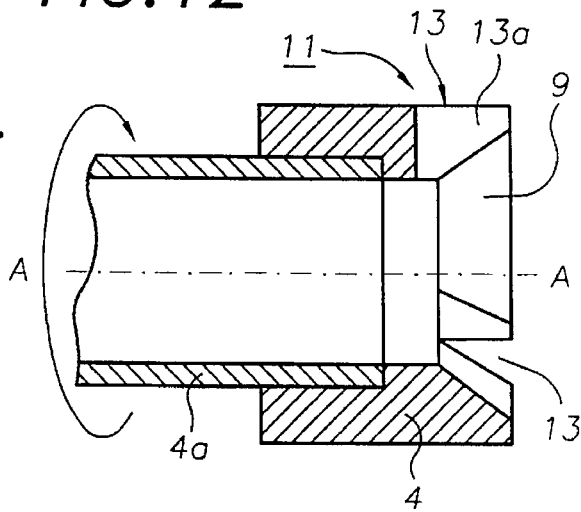

ROTATION CLUTCH FOR THE DRIVE OF CLEANING SPIRALS

The invention pertains to a rotary clutch for the drive of cleaning spirals with a set of clutch jaws, which can move radially with respect to the axis A—A of the clutch, and each of which has an inner friction surface for carrying along the cleaning spiral and at least one outer first control surface extending at an angle to clutch axis A—A. A drivable control sleeve with at least one second inner control surface can be moved, toward the first outer control surface, the inner control surface having an inclination comparable to that of the outer control surfaces of the clutch jaws.

A pipe cleaning machine in which a rotary clutch of the type described above is used is known from U.S. Pat. No. 4,447,926 which is incorporated herein by reference. In the known rotary clutch, the control surfaces of the clutch jaws are sectors of the surfaces of a truncated cone, which act in cooperation with control sleeves, the control surfaces of which are also the surfaces of a pure truncated cone. As a result, the clutch jaws of the driven control sleeve are rotated only by frictional forces, and the clutch jaws transmit the torque in turn by frictional forces to the cleaning spiral. What we have, therefore, is a set of two frictionally paired elements connected mechanically in series, and the torque is transmitted because the frictional pairing between the driven control sleeve and the clutch jaws has a larger average diameter than the frictional pairing between the clutch jaws and the cleaning spiral. The clutch jaws are compressed by the previously described conical surfaces under the force of the axial compression exerted by the control sleeves. This compression must be done manually by the operator. This process requires not only a considerable amount of force on the part of the operator but also a careful monitoring of the functioning of the machine, which will be discussed in more detail below.

A cleaning spiral is not a spiral in the mathematical sense, but rather a helical spring of considerable length, which can also be assembled by connecting partial lengths of cleaning spirals by means of suitable plug-type clutch. The operator of the pipe cleaning machine guides the cleaning spiral in a wide arc into the entrance of the pipeline to be cleaned. The operator lets the cleaning spiral pass through his hand and tries to shorten the length of the arc by exerting pressure with his hand, as a result of which the cleaning spiral works its way into the clogged pipeline by the action of the cleaning tool attached to its end. Cleaning tools which can be used include drills, ring saws, milling tools, whirling chains, wire brushes, etc., to mention only a few. By guiding the arc of the cleaning spiral by hand, the operator acquires a sense of whether and how fast the cleaning tool at the end of the cleaning spiral is working. When the cleaning tool is having difficulty advancing, it may be necessary under certain circumstances to start over again, possibly several times, and possibly in conjunction with a temporary change in the direction of rotation of the cleaning spiral. The torque in this case must be carefully watched to prevent the cleaning spiral from twisting too much. The slippage which occurs in the frictional pairing between the control sleeve and the clutch jaws cannot be monitored very effectively and thus causes problems, which demand a considerable degree of skill on the part of the operator.

SUMMARY OF THE INVENTION

The invention is therefore based on task of providing a rotary clutch which makes it possible for the drive torque on the cleaning spiral to be controlled more easily and reliably. This accomplished by means of the rotary clutch described above, in which the clutch jaws and the control sleeve, two of which are provided, are provided with positively engaging carrier elements.

Because of the measure according to the invention, one of the frictional pairings is eliminated, and the pressure applied between the driven control sleeve and the clutch jaws serves exclusively to transfer the axial motion of the control sleeve into a radial movement of the clutch jaws. A functional frictional pairing therefore remains only between the clutch jaws and the cleaning spiral, and the frictional conditions are much easier to monitor and to control. In addition, it has been found that, as a result, the actuating forces required from the operator are reduced by about 30–50% under otherwise identical geometric relationships, so that the operator is subjected to much less fatigue.

In addition, the transmission of force by friction between the clutch jaws and the cleaning spiral is more reliable, because only pointwise or linear contact occurs between the clutch jaws and the cleaning spiral, the surfaces which slide on each other having very different degrees of curvature. In contrast, the control surfaces between the control sleeves and the clutch jaws have nearly the same radii of curvature and even rest with full surface contact on each other in one intermediate position. As a result, in the event that moisture or slippery media intrude between the control surfaces according to the state of the art, it is possible for slippage to occur at the point of this frictional pairing. An event of such a kind at this point, however, is highly undesirable. Slippage under unfavorable operating conditions is also reliably avoided by the object of the invention.

It is especially advantageous for each clutch jaw to be provided with a projection as a carrier element, projecting out from its control surface, and for the control sleeves to be provided with recesses as carrier elements, the number of which corresponds to that of the clutch jaws.

It is especially advantageous in this case for the projections of the clutch jaws to be formed by parallel lateral surfaces and for the recesses in the control sleeves to be formed by radial gaps with side walls which are also parallel to each other, between which the projections of the clutch jaws are situated with freedom to slide in both the axial and radial directions.

Additional advantageous embodiments of the object of the invention can be derived from the remaining subclaims. Of particular importance is the mirror-image symmetry of the rotary clutch.

BRIEF DESCRIPTION OF THE DRAWING

An exemplary embodiment of the object of the invention is described in greater detail below on the basis of FIGS. 1 and 2:

FIG. 7 shows a side view of an individual clutch jaw;

FIG. 8 shows an axial view of the clutch jaw according to FIG. 7;

FIG. 9 shows a top view of the clutch jaw according to FIG. 7;

FIG. 10 shows a radial section through the clutch jaw according to FIG. 9 along line 10—10;

FIG. 11 shows an axial view of the control surfaces of the control sleeve; and

FIG. 12 shows an axial section through the object of FIG. 11 along line 12—12.

DETAILED DESCRIPTION OF THE PREFERRED EMBODIMENT

Figure 1:
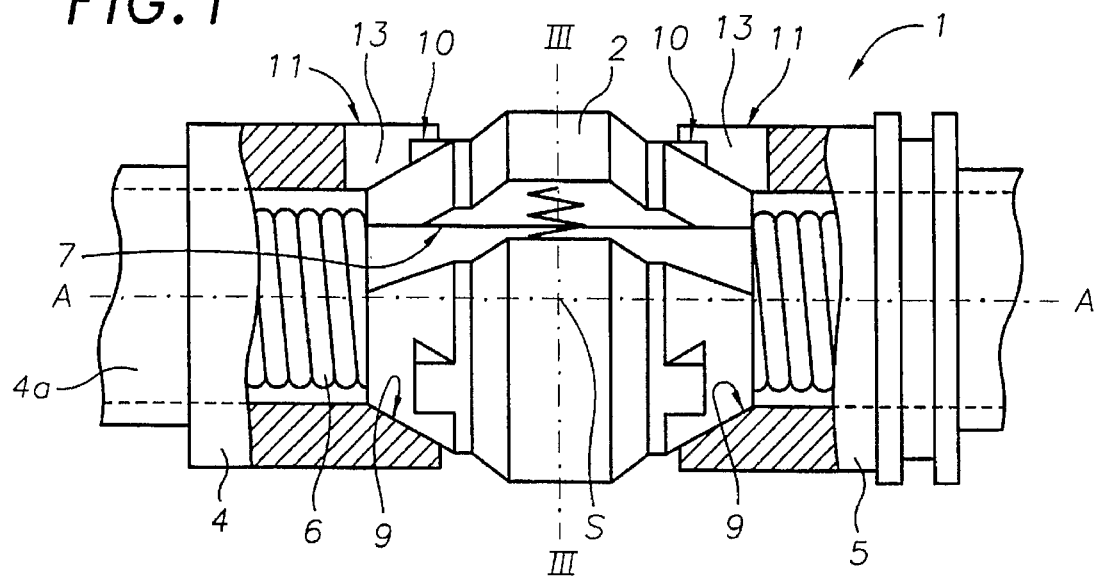
FIG. 1 shows a partial axial section through a rotary clutch, which cooperates with a cleaning spiral with an outside diameter of 22 mm.
Figure 2:
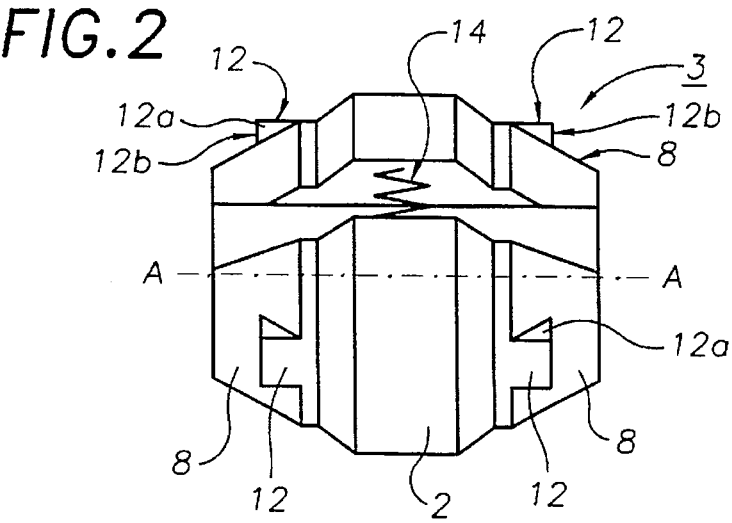
FIG. 2 shows a side view of the clutch jaws according to FIG. 1 by themselves.
Figure 3:
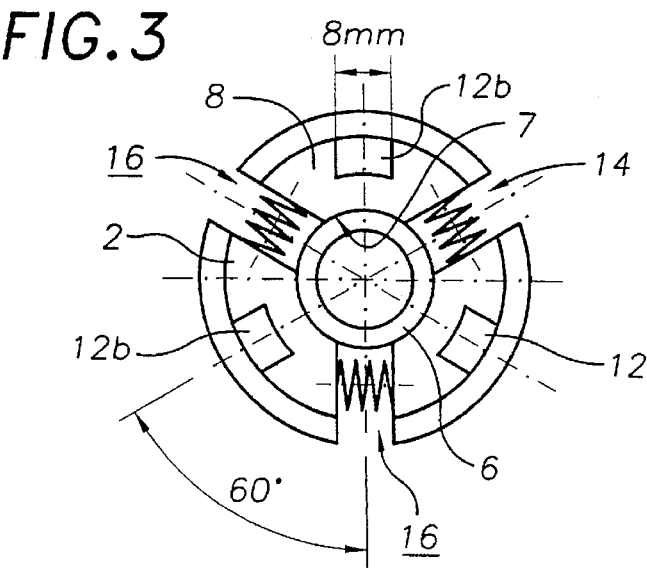
FIG. 3 is an end view of the clutch jaw, of FIG. 2.

FIGS. 1–3 shows a rotary clutch 1 with a set 3 of jaws consisting of three identical clutch jaws 2 between a first control sleeve 4 and a second control sleeve 5, one of which is connected in a manner not shown by way of a toothed belt to a drive motor. The other control sleeve in question runs freely along with the first one. One of the two control sleeves can also be moved axially under the influence of a hand crank (not shown), whereas the other control sleeve is supported against a thrust bearing (not shown) mounted on the housing. For the sake of a better understanding of these relationships, reference is made to U.S. Pat. No. 4,447,926.

A cleaning spiral 6 passes through set 3 of jaws; in the present case, the spiral has an outside diameter of 22 mm. Each clutch jaw has axially opposed ends, an inner friction surface 7 (FIGS. 3, 8, and 10) to carry along the cleaning spiral 6 and two outer first control surfaces 8, one at each end, extending at an angle to axis A—A of the clutch. These surfaces are designed at least essentially as convex, sector-shaped surfaces of a truncated cone. Toward these control surfaces 8, the two control sleeves 4, 5 can execute relative motion, each sleeve having at least one second inner control surface 9, the inclination of which is comparable to that of outer control surfaces 8 of clutch jaws 2. Clutch jaws 2 and control sleeves 4, 5 are provided with positively engaging carrier elements 10, 11.

As can be seen from FIG. 1, rotary clutch 1 is designed with mirror-image symmetry with respect to the radial cross-sectional plane III—III, in which the center of gravity of the clutch also rests. On each side of this plane of symmetry, each of the clutch jaws 2 is provided with a projection 12 as carrier element, which projects out from control surface 8. Correspondingly, control sleeves 4, 5 are provided with recesses 13 as carrier elements, the number of which is the same as the number of clutch jaws 2. Projections 12 of clutch jaws 2 are bounded by lateral surfaces 12a, which are parallel to each other. Recesses 13 in control sleeves 4, 5 are formed by radial gaps with side walls 13a, which are also parallel to each other (see FIGS. 11 and 12), between which projections 12 of clutch jaws 2 are situated with the freedom to slide in both the axial and radial directions. The movement which results occurs in accordance with the inclination of the control surfaces and is composed of the indicated axial and radial components.

The control surface according to the state of the art is designed in the form of a hollow truncated cone. In the present case, as a result of recesses 13 with a 3-part set 3 of jaws, it consists of three control surfaces 9, although all three are located on a common surface of a hollow truncated cone. Control surfaces 9 are therefore sectors of the surface of a hollow, truncated cone.

End surfaces 12b of projections 12 are situated on each side of the plane of symmetry III—III, each one on its own radial plane, although this is not a mandatory feature.

The individual clutch jaws 2 are held apart by compression springs 14, the axes of which are perpendicular to side walls 15 of clutch jaws 2 (see FIGS. 7 and 8). When control sleeves 4, 5 are pushed together, clutch jaws 2 are pressed together as intermediate spaces 16 between the individual clutch jaws are reduced. When control sleeves 4, 5 are pulled apart, compression springs 14 again increase the indicated intermediate spaces 16, insofar as the distance separating control sleeves 4, 5 and the inclination of control surfaces 8, 9 allow. Of course, compression springs 14 also exert a certain restoring force of their own on the distance between control sleeves 4, 5.

Figure 4:
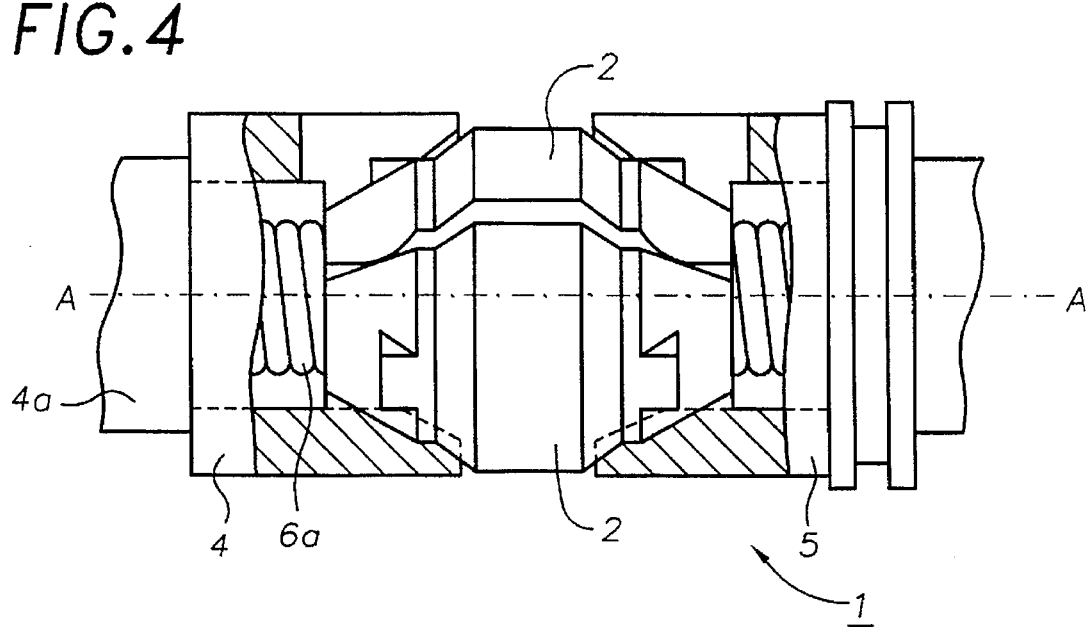
FIG. 4 shows a partial axial section through the rotary clutch according to FIG. 1, but here it is cooperating with a cleaning spiral with an outside diameter of 16 mm.
Figure 5:
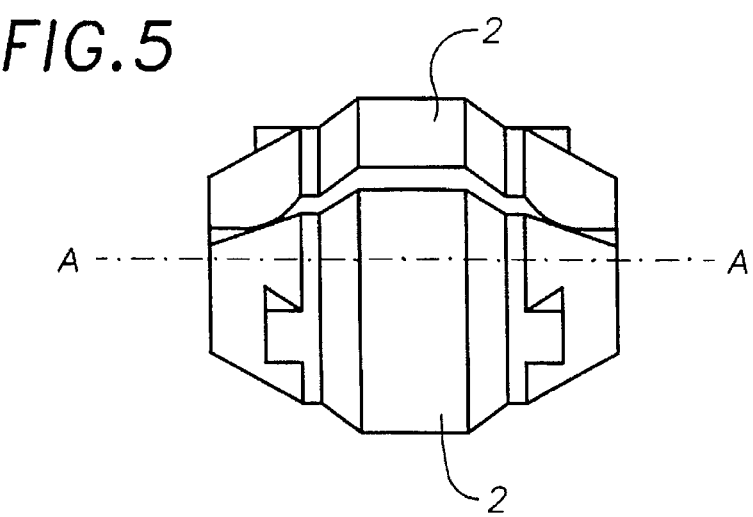
FIG. 5 shows a side view of the clutch jaws according to FIG. 4 by themselves.
Figure 6:
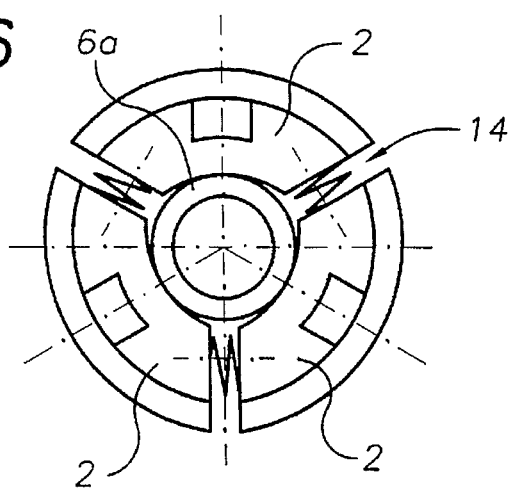
FIG. 6 is an end view of the clutch jaws of FIG. 4.

FIGS. 4–6 show the cooperation of the same rotary clutch 1 with a cleaning spiral 6a of a smaller diameter, namely, of 16 mm. It can be seen from these figures that, in this case, compression springs 14 are compressed to a much greater extent as intermediate spaces 16 are reduced. The radius of curvature of inner friction surface 7, which, in the exemplary embodiment according to FIGS. 1–3, is the same as the radius of the cleaning spiral, is now much larger than the radius of cleaning spiral 6a, so that friction surface 7 now rests only at certain individual points on cleaning spiral 6a. This is completely adequate, however, to transmit sufficient torque to cleaning spiral 6a.

The occurrence of slippage or spinning between control sleeve 4 or 5 and clutch jaws 2 is excluded in both exemplary embodiments by the presence of carrier elements 10, 11.

Further details of the individual clutch jaws 2 can be seen in FIGS. 7–10.

FIGS. 7–10 show bores 17, which proceed in the perpendicular direction from side walls 15 and serve to accept the ends of compression springs 14.

In FIG. 9, these bores 17 are shown in dotted line, because they are behind cylindrical 2a of clutch jaws 2.

It can be seen from FIG. 12, furthermore, that control sleeve 4 is attached to a hollow shaft 4a, which is either driven or supported rotatably in a thrust bearing. Similar attachment conditions also apply to control sleeve 5. The inside diameter of hollow shaft 4a must, of course, be the same as the maximum outside diameter of cleaning spiral 6, so that the spiral can be guided easily through the hollow shafts.

What is claimed is:

1. Rotary clutch for driving a cleaning spiral of a pipe cleaning machine, said clutch comprising
    a plurality of clutch jaws radially arranged with respect to a central axis and movable radially with respect to said axis, each jaw having axially opposed ends, an inner friction surface facing said axis and an outer control surface at an angle to said axis at each said end, said inner friction surface being profiled to frictionally engage a cleaning spiral,
    a first control sleeve movable axially toward said clutch jaws and having an inner control surface at said angle to said axis, said inner control surface being engageable against said outer control surfaces at one end of said jaws,
    a second control sleeve having an inner control surface at said angle to said axis, said inner control surface being engageable against said outer control surfaces at the other end of said jaws, whereby axial movement of said first control sleeve toward said second control sleeve causes said inner control surfaces to engage said outer control surfaces to move said jaws radially toward said axis, and
    means for positively fixing at least one of said control sleeves against rotation relative to said clutch jaws when said inner control surface engages said outer control surfaces.

2. Rotary clutch as in claim 1 wherein said means for fixing comprises recess means on one of said inner control surface and said outer control surfaces and projection means on the other of said inner control surface and said outer control surfaces, said projection means being received in respective said recess means.

3. Rotary clutch as in claim 2 wherein said projection means comprises a projection extending axially from each outer control surface and a corresponding plurality of recesses in said inner control surface.

4. Rotary clutch as in claim 1 comprising means for fixing both of said control sleeves against rotation relative to said clutch jaws.

5. Rotary clutch as in claim 1 wherein the outer control surfaces at each end collectively define a frustoconical surface, the inner control surfaces of each sleeve likewise defining a frustoconical surface.

* * * * *